(12) United States Patent
Skaugset (10) Patent No.: US 10,690,265 B2
(45) Date of Patent: Jun. 23, 2020

(54) FAIRING AND METHOD

(71) Applicant: Statoil Petroleum AS, Stavanger (NO)

(72) Inventor: Kjetil Skaugset, Tiller (NO)

(73) Assignee: Equinor Energy AS, Stavanger (NO)

( * ) Notice: Subject to any disclaimer, the term of this patent is extended or adjusted under 35 U.S.C. 154(b) by 2 days.

(21) Appl. No.: 16/353,197

(22) Filed: Mar. 14, 2019

(65) Prior Publication Data

US 2019/0203852 A1 Jul. 4, 2019

Related U.S. Application Data

(63) Continuation of application No. 14/893,790, filed as application No. PCT/EP2013/064028 on Jul. 3, 2013, now Pat. No. 10,274,107.

(51) Int. Cl.
| | |
|---|---|
| *F16L 1/15* | (2006.01) |
| *F16L 1/12* | (2006.01) |
| *B63B 21/66* | (2006.01) |
| *E21B 17/01* | (2006.01) |
| *F15D 1/10* | (2006.01) |
| *B63B 21/50* | (2006.01) |

(52) U.S. Cl.
CPC ............ *F16L 1/123* (2013.01); *B63B 21/663* (2013.01); *E21B 17/01* (2013.01); *F15D 1/10* (2013.01); *F16L 1/15* (2013.01); *B63B 2021/504* (2013.01); *B63B 2021/666* (2013.01)

(58) Field of Classification Search
CPC ...... F16L 1/14; F16L 1/15; F15D 1/10; E02D 5/60; B63B 21/663; B63B 2021/504
USPC .......................... 405/211, 212–216; 114/243
See application file for complete search history.

(56) References Cited

U.S. PATENT DOCUMENTS

| | | | |
|---|---|---|---|
| 3,410,096 | A | 11/1968 | Schuh |
| 3,660,807 | A | 5/1972 | Depew et al. |
| 5,410,979 | A | 5/1995 | Allen et al. |
| 5,421,413 | A | 6/1995 | Allen et al. |

(Continued)

FOREIGN PATENT DOCUMENTS

| | | |
|---|---|---|
| CN | 101475049 A | 7/2009 |
| EP | 0096956 A1 | 12/1983 |

(Continued)

OTHER PUBLICATIONS

Apr. 12, 2013—(WO) International Search Report and Written Opinion—App PCT/EP2013/3057657.

(Continued)

*Primary Examiner* — Sunil Singh
(74) *Attorney, Agent, or Firm* — Banner & Witcoff Ltd.

(57) ABSTRACT

A fairing device and method for the reduction of vortex-induced vibrations or motions, the minimization of drag about a substantially cylindrical element immersed in a fluid medium, comprising; a fairing rotatably mounted about the cylindrical element, the fairing comprising a shell with a mainly cylindrical cross-sectional shape with an outer diameter (D) following the outer diameter of the cylindrical element from an upward stagnation point of 0 degrees to at least +/−90 degrees, and which at +/−90 degrees continues as two fin-like portions in an aft direction, further comprising that the fin-like portions are convexly curved aft of +/−90 degrees thus tapering towards each other and defining a tail end opening or gap less than the fairing standoff height. A method for mounting, storage, and deployment of the fairing device is also disclosed.

23 Claims, 9 Drawing Sheets

Section of inside of fairing with hinged shape-fixation device and locking pin for method 1.

(56) References Cited

U.S. PATENT DOCUMENTS

| | | | |
|---|---|---|---|
| 5,984,584 | A | 11/1999 | McMillan et al. |
| 6,010,278 | A | 1/2000 | Denison et al. |
| 6,067,922 | A | 5/2000 | Denison et al. |
| 6,179,524 | B1 | 1/2001 | Allen et al. |
| 6,196,768 | B1 | 3/2001 | Allen et al. |
| 6,223,672 | B1 | 5/2001 | Allen et al. |
| 7,513,209 | B2 | 4/2009 | Masters et al. |
| 7,644,675 | B1 | 1/2010 | Ha |
| 2006/0021560 | A1 | 2/2006 | McMillan et al. |
| 2007/0215028 | A1 | 9/2007 | Lie |
| 2008/0025800 | A1 | 1/2008 | Watkins |
| 2008/0035351 | A1 | 2/2008 | Masters et al. |

FOREIGN PATENT DOCUMENTS

| | | |
|---|---|---|
| EP | 2049805 A2 | 4/2009 |
| GB | 1408711 A | 10/1975 |
| NL | 7217431 A | 7/1973 |
| WO | 9822336 A1 | 5/1998 |
| WO | 2011072033 A1 | 6/2011 |

OTHER PUBLICATIONS

Mar. 20, 2014—(WO) International Search Report and Written Opinion—App PCT/EP2013/064028.
Apr. 12, 2013—(PCT) International Search Report—PCT/EP2013/3057657.
Mar. 20, 2014—(PCT) International Search Report and Written Opinion—App PCT/EP2013/064028.
Sarpkaya, T., Jun. 1979, "Vortex-Induced Oscillations", Journal of Applied Mechanics 46, pp. 241-258.
Blevins, Robert D., 1994, Flow-Induced Vibration: Van Nostrand Reinhold, pp. 77-81.
Griffin, O.M. & Ramberg, S.E., Mar. 1982, "Some Recent Studies of Vortex Shedding with Application to Marine Tubulars and Risers", ASME Journal of Energy Resourses Technology, vol. 104, pp. 2-13.
Naudascher E. & Rockwell, D., 1994, "Flow-Induced Vibrations, An Engineering Guide", Hydraulic Structures Design Manual, Balkema, Rotterdam, pp. 156-171.
Kristiansen, T., Apr. 2009, Two-Dimensional Numerical and Experimental Studies of Piston-Mode Resonance, Ph.D. thesis, Norwegian University of Science and Technology.
Sumer, B.M., & Fredose, J., 1997, Hydrodynamics Around Cylindrical Structures, vol. 12, World Scientific: Singapore.
Skaugset, K.B., 2003, On the Supression of Vortex Induced Vibrations of Circular Cylinders by Radial Water Jets, Ph. D thesis, Norweigian University of Science and Technology.
Faltinsen, O.M., 1995, "Sea Loads on Ships and Offshore Structures", Cambridge University Press.
Bearman, P.W., 1984, "Vortex Shedding from Oscillating Bluff Bodies", Annual Review of Fluid Mechanics, 16, pp. 195-222.
Dec. 2, 2016—(CN) Office Action—App 2016112901846900.

Figure 1a. Prior art parallel fin fairing.

Figure 1b. Prior art fairing.

Figure 1c. Prior art fairing.

Figure 2. Asymmetric Crab Claw 1 (ACC1), perspective.

Figure 3. ACC1 mounted about cylindrical element.

Figure 4a. ACC1 descriptive perspective.

Figure 4b. ACC1 fairing cross-section from point A to point B along span.

Figure 4c. ACC1 fairing cross-section from point B to point C along span.

Figure 5. Amplitude Ratio, A*, versus Nominal Reduced Velocity, U* for Freely Vibrating ACC1 Fairing, Comparing the 4 Frequency Tests.

Figure 6. Drag Coefficient, $C_D$, versus Re for Freely Vibrating ACC1 Fairing, Comparing 4 Frequency Tests.

Figure 7. Amplitude Ratio versus Nominal Reduced Velocity, $U^*$ for the ACC_T95 Fairing with Categorized Lift Coefficient, $C_{LV}$.

Figure 8. Amplitude Ratio, A*, versus Nominal Reduced Velocity, U* for Freely Vibrating ACC1_30 Fairing, Comparing the 4 Frequency Tests.

Figure 9a. Theoretical stability analysis curves for prior art fairing from Figure 1b. X-axis Flow velocity (m/s) versus Y-axis stability factor q(U).

Figure 9b. Theoretical stability analysis curves for prior art fairing from Figure 1c. X-axis Flow velocity (m/s) versus Y-axis stability factor q(U).

Figure 9c. Theoretical stability analysis curves for ACC1 fairing. X-axis Flow velocity (m/s) versus Y-axis stability factor q(U).

Figure 10. Prior art riser joint without fairing.

Figure 11. Riser joint with three preinstalled fairings with strips, perspective.

Figure 12. Riser joint with three preinstalled fairings with strips.

Figure 13. Section of riser joint with preinstalled fairing, strips removed.

Figure 14. Section of inside of fairing with hinged shape-fixation device for method 1.

Figure 15. Section of inside of fairing with hinged shape-fixation device and locking pin for method 1.

Figure 16. Section of cylindrical element with hinged shape-fixation device for method 2.

Figure 17. Section of cylindrical element with hinged shape-fixation device and fairing device for method 2.

Figure 18. Section of cylindrical element with insertable shape-fixation device and fairing device for method 3.

FAIRING AND METHOD

CROSS-REFERENCE TO RELATED APPLICATIONS

This is a continuation application based on Ser. No. 14/893,790 filed Nov. 24, 2015 entitled "Fairing and Method", now U.S. Pat. No. 10,274,107, which is a U.S. National Phase of International Application No. PCT/EP2013/064028, filed Jul. 3, 2013, entitled "Fairing and Method" and designating the United States of America. This application claims the benefit of the above-identified application which is incorporated by reference herein in its entirety.

FIELD OF THE INVENTION

The present invention relates generally to the reduction of vortex-induced vibration ("VIV") and more particularly to a fairing device for the reduction of VIV on pipes or other structural components immersed in a fluid and a method for storage and deployment for fairing devices.

BACKGROUND OF THE INVENTION

The search for oil and gas reserves over the past several decades has lead to the need for exploration in ever deeper waters. This in turn has lead to the need for offshore producers to build structures that can withstand strong ocean currents that could threaten the structural integrity of pipelines, risers or other immersed components.

The VIV oscillations of marine risers are known to increase drag, and have led to structural fatigue. One proven means of suppressing this vibration is the use of fairings and strakes. These coverings essentially modify the flow along the cylinder, tripping the production of Karman vortices so that they act less coherently or far enough downstream so they interact less with the body. In the existing prior art there are two general types of structures, helical strakes and fairings, for the suppression of VIV or vortex induced motions (VIM) around vertically disposed immersed objects such as risers or other supportive construction elements.

Helical Strakes:

Helical strakes are attached on the outside of a structure in order to suppress VIV by altering the vortex shedding pattern as well as the correlation of vortices shed along the length of the specimen. The most common helical strake geometry is the three-start strake. This consist of three triangular or trapezoid profiles which are helically wound and extend along the length of the specimen. The profiles can be permanently fixed to the specimen, or more commonly; attached using modules that are attached to the specimen. Regardless of attachment method, helical strakes are not designed to shift any during operation but rather stay in a stationary position relative to the object. Two main parameters defines the global shape of strakes: pitch (P/D) and strake height ratio (h/D), where P designates the pitch of the strake in relation to the main direction of flow, D is the outside diameter of the cylinder and h is the external cross-sectional distance from the cylindrical member to the strake-tip. In addition, the local geometry of the strake profile itself characterizes the helical strakes.

Fairings:

Fairings are attached to a structural member in order to alter the vortex shedding pattern of that member when subject to ambient fluid flow. Fairings are attached in a way that allows for the fairing to rotate around the center of the structural member (for example a marine drilling riser) to which it is attached. This allows for the fairing to align with the direction of the ambient flow. Various cross sectional designs of fairings exist today.

In addition, other means of suppressing VIV also exist, such as perforated shrouds, but all suffer from some negative aspects that favour the two groups of concepts above to be used widely in industry today.

Such prior art systems as mentioned above are documented in the literature and are given in the following. Books and papers on suppression on Vortex induced vibrations and methods of VIV suppression:

Sarpkaya, T., 1979, "Vortex-induced oscillations", Journal of Applies Mechanics 46, pp. 241-258.

Blevins, R. D., 1990, Flow-induced Vibrations, Van Nostrand Reinhold: New York, USA.

Griffin, O. M. & Ranberg, S. E., 1982, "Some recent studies of vortex shedding with application to marine tubulars and risers", ASME Journal of Energy resources Technology, 104, pp. 2-13.

Bearman, P. W., 1984, "Vortex shedding from oscillating bluff bodies", Annual review of Fluid Mechanics, 16, pp. 195-222.

Zdravkovich, M. M., 1997, Flow around circular cylinders, Vol. 1: Fundamentals, Oxford University Press: London, UK.

Naudascher, E & Rockwell, D., 1993, Flow-Induces Vibrations: An Engineering Guide. Balkema: Rotterdam, Netherlands.

Faltinsen, O. M., 2005, Hydrodynamics of High-Speed Marine Vehicles. Cambridge University Press.

Kristiansen, T., 2009, Two-dimensional numerical and experimental studies of piston-mode resonance. Ph.D. thesis, Norwegian University of Science and Technology.

Newman, J. N., 1977, Marine Hydrodynamics. The MIT Press, Cambridge, Mass.

Sumer, B. M. & Fredøse J., 1997, Hydrodynamics around Cylindrical Structures. World Scientific: Singapore.

Skaugset, K. B., 2003, On the Suppression of Vortex Induced Vibrations of Circular Cylinders by Radial Water Jets, Ph.D. thesis, Norwegian University of Science and Technology.

Patent publication in this field includes the following: U.S. Pat. Nos. 5,410,979, 5,421,413, 5,984,584, 6,010,278, 6,067,922, 6,179,524B1, 6,196,768B1, 6,223,672B1, US2006/0021560A1 and EP2049805B1.

In the following, the status of the mentioned prior art is explained in more detail. In terms of helical strakes known from the prior art, the following aspects and limitations should be noted:

Ability to Suppress Vortex Induced Vibrations (VIV):

Specific dimensions of helical strakes are needed to achieve proper VIV suppression characteristics. The pitch and strake height are vital parameters. In general, increasing the strake height has a positive effect on VIV suppression characteristics. However, this comes with the price of high drag forces.

High Drag Forces:

As explained above, helical strakes will increase drag forces on the structural member. This represents a structural capacity issue as well as potential operational limitations. In the case of a marine drilling riser, this can limit the operation in terms of pre-tension, top and bottom angle limitations and maximum tension in the riser. As a result, the drilling unit may be forced to suspend drilling operations in strong currents.

In terms of fairings, and in particular marine fairings known from the prior art, the following aspects and limitations should be noted:

Ability to Suppress Vortex Induced Vibrations (VIV):

The main reason for attaching fairing as a VIV suppression device is to reduce vibrations and material fatigue on the structure. However, existing fairings have varying suppression performance. For example, the flow condition window in which prior art fairings work as intended is limited. As the flow condition experienced (such as ocean currents) is not deterministic but varies in magnitude and direction for a given location, it is vital to attain excellent VIV suppression characteristics for all operating conditions. Hence a fairing design that only works in a specific flow condition window is undesirable.

Global Stability:

Existing fairings may become globally instabile for specific current flow conditions. This is a resonance phenomenon. The motions associated with such global instability can be devastating for a structural member. Motions will become considerably greater than the ones associated with VIV response, and may cause rapid material fatigue or structural overload. For an offshore application, the associated potential for loss of containment of hydrocarbons and the Health, Safety and Environment (HSE) risk can be relatively high.

Global Loads on the Structure:

Fairings are in general associated with relatively low drag forces. However, there is much room for improvement compared to existing designs. Local forces on the fairing are known to harm fairings during deployment, retrieval and operation. This is especially the case for large fairings and associated with interactions from waves either in the moonpool or in the upper part of the water column where wave action is most predominant. Fluid forces on the individual parts of the fairing may become large enough to cause the fairing to structurally disintegrate or get stuck, preventing weather-vaning, during operation. As this is known to have halted drilling operations, there is a need for new fairings to be small and robust in order to avoid this.

Robustness

Operational Issues:

When deploying fairings on an offshore drilling unit several key operational challenges are associated with the fairing size and weight. Small, light fairings could overcome many operational issues.

Storage:

Present fairings or helical strakes require relatively large storage space on a drilling unit. Some drilling units may have very limited space to carry such devices.

Installation and Retrieval Time and Cost:

A key cost factor for a drilling operation is the time to deploy and retrieve a marine riser. Using traditional helical strakes or marine fairings will halt normal operations due to manual labour involved in attaching the VIV suppression devices onto each joint of the marine riser. Increased total deployment and retrieval time will not only increase total time spent on the operation, but also increase demand on the available weather window needed to perform the operation. Offshore drilling units charge high daily rig rates, hence increased time for installation and deployment can prove very costly.

Installation and Retrieval HSE:

High unit weight and size of a VIV suppression device is not only time consuming, but does also represents an HSE risk in the installation and retrieval phases.

Installation Feasibility:

Due to limited space on the drilling floor, a simpler and more compact system and method for storage and deployment is needed.

SUMMARY OF THE INVENTION

Therefore, it is an object of the invention to provide a fairing system and method for preinstalling and deploying said fairings which is more effective and economic than the known prior art.

This object is solved with a system and method according to the independent claims. Advantageous further developments and embodiments are subject of the dependent claims and in the detailed description and figures.

DETAILED DESCRIPTION OF THE INVENTION

Figure 1A:
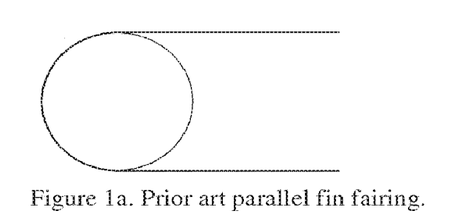
FIG. 1a-1c. Faring types according to the prior art.
Figure 1B:
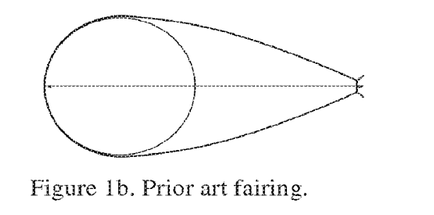
Figure 1C:
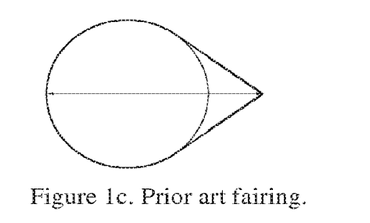
Figure 2:
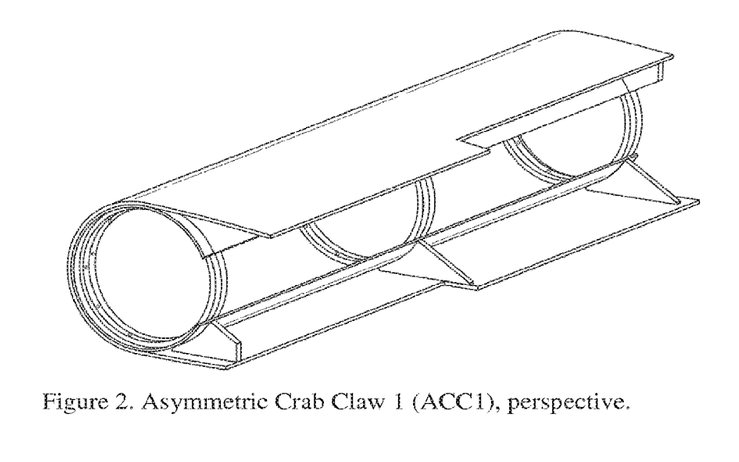
FIG. 2. ACC1 perspective.
Figure 3:
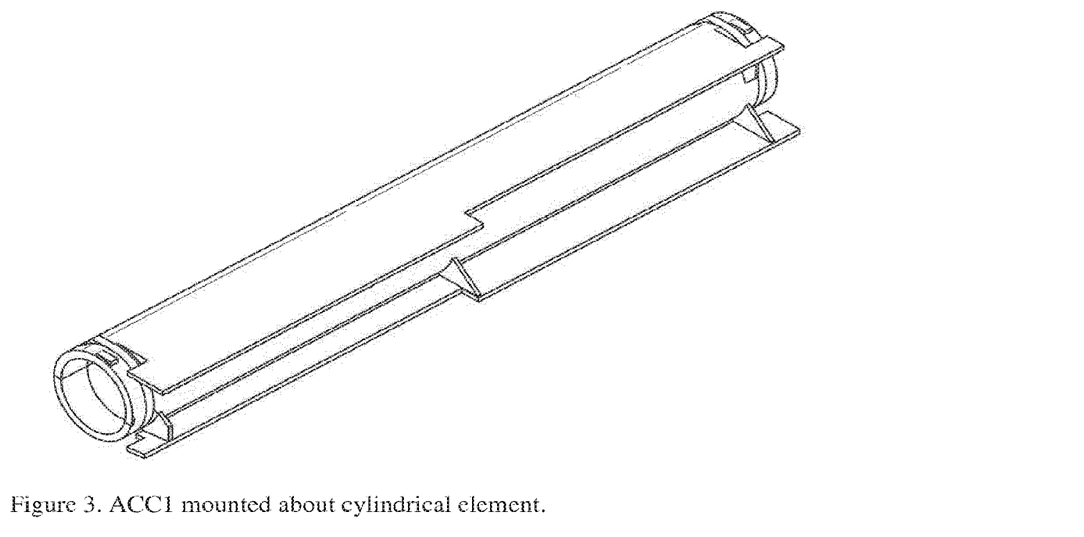
FIG. 3. ACC1 perspective with cylindrical element.

The present invention represents a vast improvement over the prior art as mentioned in the background section and FIGS. 1a-1c, whereby the mentioned shortcomings of the prior art are addressed by the following embodiments.

Asymmetric Crab Claw (ACC) Fairing Device

The invention is a new specific fairings design which through thorough testing has shown superior performance as compared to existing technology. This device is attached to a circular cylinder for suppression of vortex induced vibrations (VIV) or vortex induced motions (VIM). The device is able to rotate around the cylinder, and is hence able to align with the ambient current direction.

Shape of the ACC Fairing

The shape of the fairings is specific to the invention. When describing the shape, angular coordinates are used relative to the circular cylinder around which the fairings is applied. In this context, the upstream stagnation point for a stationary mainly circular cylindrical element with an outer diameter (D) in steady inviscid flow is denoted 0 deg, while the one downstream is at 180 deg. This invention consist of a fairing where the cross sectional shape is changed at near half the axial length, or span, of the fairing. The cross sectional shape (CS1) at the portion A is mirrored along the axis X-X and becomes the cross sectional shape (CS2) for portion B of the segment.

Figure 4A:
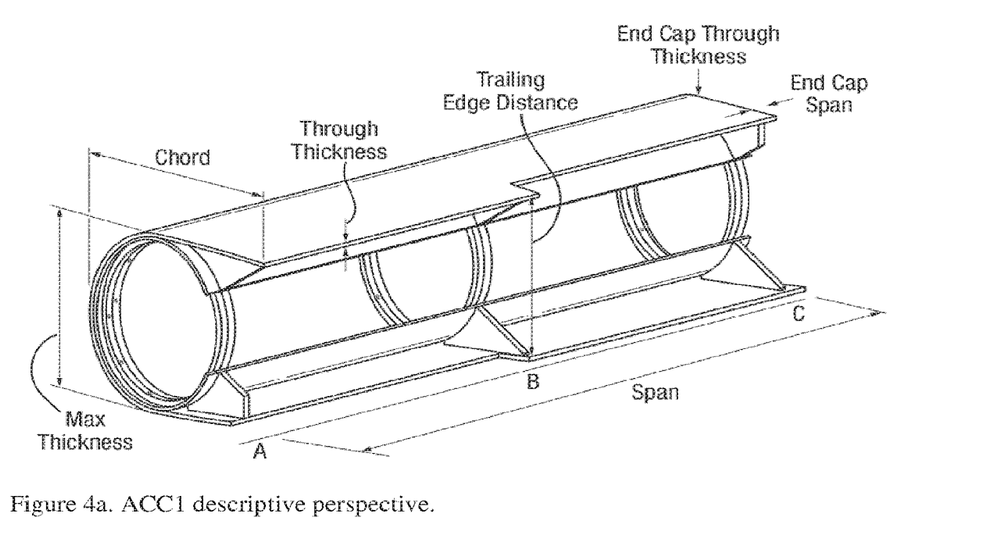
FIG. 4a. ACC1 descriptive perspective.
Figure 4B:
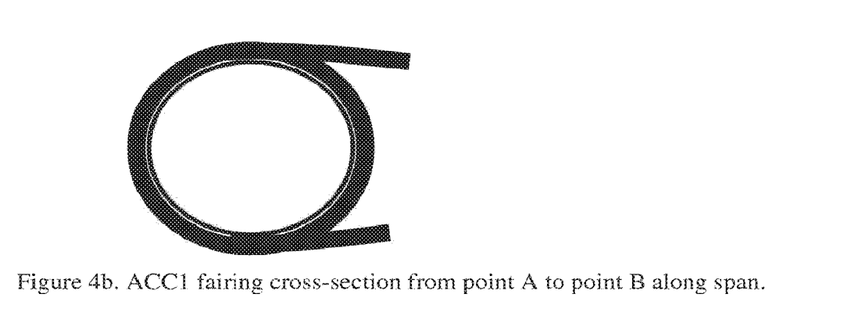
FIG. 4b. ACC1 fairing cross-section from point A to point B along the span.
Figure 4C:
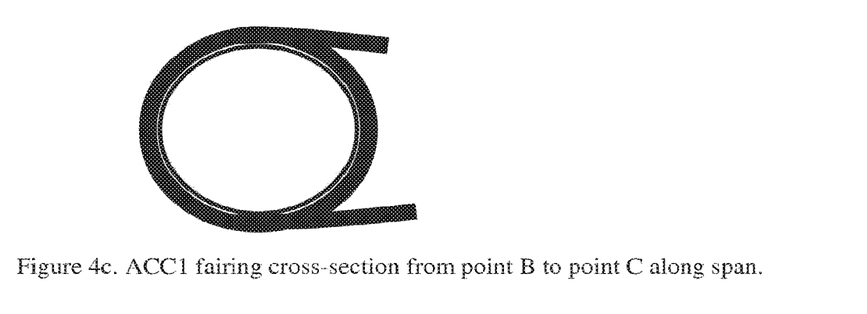
FIG. 4c. ACC1 fairing cross-section from point B to point C along the span.

The present embodiment is further defined by:

a) The shape of the fairing is convexly curved aft of +/−90 deg. The fairing can be curved also upstream of +/−90 deg, but after +/−90 deg curving is a pre-requisite.

b) Chord length (C): The overall fairing chord length ratio C/D can in an embodiment of the invention be 1.4 or below. The chord length (C) being the length from the leading edge of the fairing to the tail end of the fairing fin as shown in FIG. 4a.

c) Asymmetric chord length 1: The overall fairing chord length ratio C/D is 1.4 or below.

d) Asymmetric chord length 2: The overall fairing chord length ratio C/D is 1.15 or below.

e) The tail end opening is more than 80% of the fairing standoff height (maximum thickness). The invention also covers opening lower than 80%, but it is seen from tests, that the invention has best performance if the opening is more than 80%.

For all embodiments, the fairing standoff height is defined as the maximum cross-sectional distance between the opposing fins of the fairing, as measured external from the fairing. The term convexly, refers to a convex form as seen external to the fairing, having a outward projection away from the cylindrical element, as comparable to a double-convex optical lens, and as opposed to a concave form having an inward depression. FIGS. 2-4c showing the basic shape of the asymmetric crab claw (ACC1) fairing illustrate this further. Tables 1-4 show non-limiting examples of dimensions of various embodiments of ACC fairings as used in hydrodynamic tests. All dimensions are in meters. For the dimensions given below, and in terms of the scope of the present invention, the ratio values between the values are of more importance than the actual dimensions themselves. Table 1 shows the dimensions of the standard ACC1 fairing.

TABLE 1

Asymmetric crab claw 1 (ACC1) test dimensions. The tests were conducted with three ACC1 fairings (north, center and south) span-to-span, axially on a beam.

| Fairing Component | Chord Length | Span | Reference Diameter | Chord cut back | Tail End Gap |
|---|---|---|---|---|---|
| North | 0.51 | 1.9 | 0.39 | 0.1 | 0.36 |
| Center | 0.52 | 1.9 | 0.39 | 0.1 | 0.36 |
| South | 0.52 | 1.9 | 0.39 | 0.1 | 0.36 |

Several other variations of the asymmetric crab claw fairing have also been developed and tested, whereby the chord lengths of both the upper and lower fins were lengthened so as to yield smaller tail end openings (gaps), with values of 95%, 90% and 85% as compared to that from the standard ACC1 tail end gap.

TABLE 2

ACC_T95 test dimensions.

| Fairing Component | Chord Length | Span | Reference Diameter | Chord cut back | Tail End Gap |
|---|---|---|---|---|---|
| North | 0.64 | 1.9 | 0.39 | 0.1 | 0.34 |
| Center | 0.64 | 1.9 | 0.39 | 0.1 | 0.34 |
| South | 0.64 | 1.9 | 0.39 | 0.1 | 0.34 |

TABLE 3

ACC_T90 test dimensions.

| Fairing Component | Chord Length | Span | Reference Diameter | Chord cut back | Tail End Gap |
|---|---|---|---|---|---|
| North | 0.62 | 1.9 | 0.39 | 0.1 | 0.31 |
| Center | 0.62 | 1.9 | 0.39 | 0.1 | 0.31 |
| South | 0.64 | 1.9 | 0.39 | 0.1 | 0.31 |

TABLE 4

ACC_T85 test dimensions.

| Fairing Component | Chord Length | Span | Reference Diameter | Chord cut back | Tail End Gap |
|---|---|---|---|---|---|
| North | 0.64 | 1.9 | 0.39 | 0.1 | 0.29 |
| Center | 0.64 | 1.9 | 0.39 | 0.1 | 0.29 |
| South | 0.64 | 1.9 | 0.39 | 0.1 | 0.29 |

The fairing device and embodiments according to the present invention can be made from low corrosive material selected from a group of materials consisting of semi-flexible, formable polyethylene, polyurethane, vinylester resin, polyvinyl chloride and fiberglass. Other materials could easily be envisaged as would be known by the skilled person.

Experimental Setup

Free VIV experiments with the fairings were conducted in the towing mode with the cylinder towed downstream of the tow struts. The carriage speed was mostly varied from 0.5 to 4.5 m/s depending upon the appearance of VIV and tow carriage limitations, giving Reynolds numbers up to about 1.4 million. Helical springs in the damping frame were also varied, resulting in nominal reduced velocities, $U^*(V_{RN})$, of 2 to 24. The free tests were done at four different values of spring stiffness for the ACC (see FIGS. 5, 6 and 8). The above mentioned fairings were tested in the range of approximately 20, 45, 48 and 128 kN/m spring stiffness, which corresponded to system frequencies of 0.6, 0.9, 1.2 and 1.5 Hz. The bare cylinder was tested at 20 and 45 kN/m to perform the qualification tests at ~0.6 and ~0.9 Hz.

Summary of Results:

In FIGS. 5 to 8 various responses of ACC-farings are shown. The tests were run with different spring setups for the entire range that is relevant for farings in deployment conditions. The main parameters for determining the applicability of new fairing designs for use in the real-world are drag coefficients, $C_D$, Reynolds number (Re), amplitude of vibration (VIV), also known as A* and the lift coefficient $C_{LV}$. In general these parameters can be plotted either against each other, or against a measure of flow velocity also known as nominal reduced velocity (U*).

Figure 5:
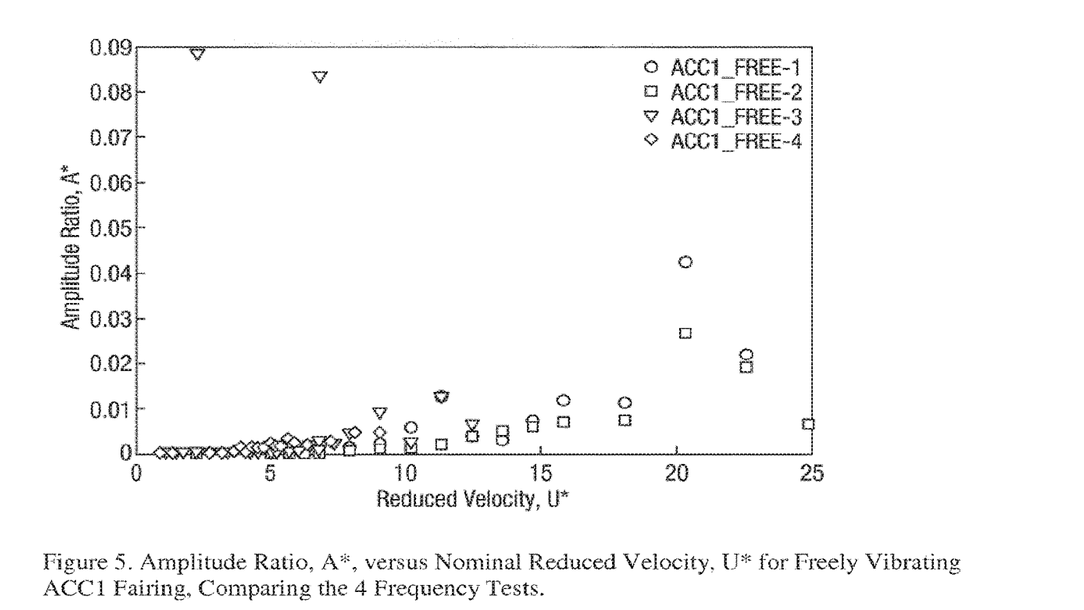
FIG. 5. Amplitude Ratio, A*, versus Nominal Reduced Velocity, U* for Freely Vibrating ACC1 Fairing, Comparing the 4 Frequency Tests.

In FIG. 5 the amplitude, A*, was plotted versus the nominal reduced velocity, U* for each of the frequencies tested for the ACC1 fairing. It shows that the different spring stiffness, hence frequencies did not have significant effect on A* of the fairing at lower values of U* (U*<15). However, there was some change in A* at high values of U* but no clear pattern was evident. There were couple of test cases with some motion which resulted in higher A* values of 0.1 with the U* values at 3 and 7. Later it is shown that these values occurred at high negative values of $C_{LV}$, which means with zero $C_{LV}$, the motion would be less and more aligned with rest of the data points. Note that the two points located on the upper left can be attributed to measurement errors. The dimensions of this particular fairing embodiment are given in Table 1.

Figure 6:
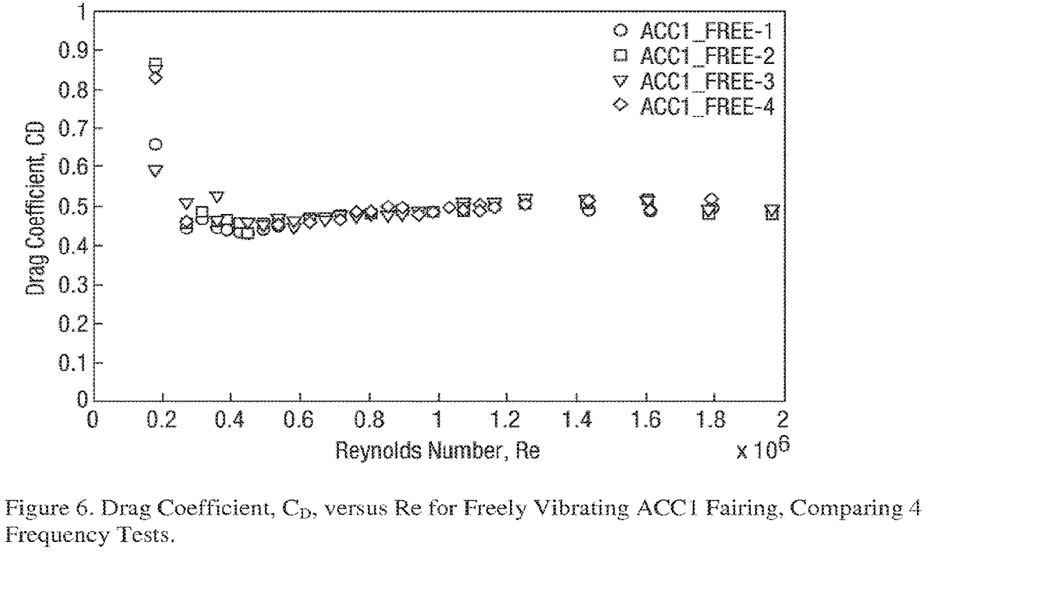
FIG. 6. Drag Coefficient, $C_D$, versus Re for Freely Vibrating ACC1 Fairing, Comparing 4 Frequency Tests.

FIG. 6 shows the drag coefficient, $C_D$, versus Reynolds number (Re) for each of the frequencies tested for the ACC1 fairing. It shows that the different spring stiffness, hence frequencies, did not have significant effect on the drag of the fairing. The fairing has an average of 0.51 for $C_D$ compared to an average of 0.50 during fixed tests. The dimensions of this this particular fairing embodiment are given in Table 1.

Figure 7:
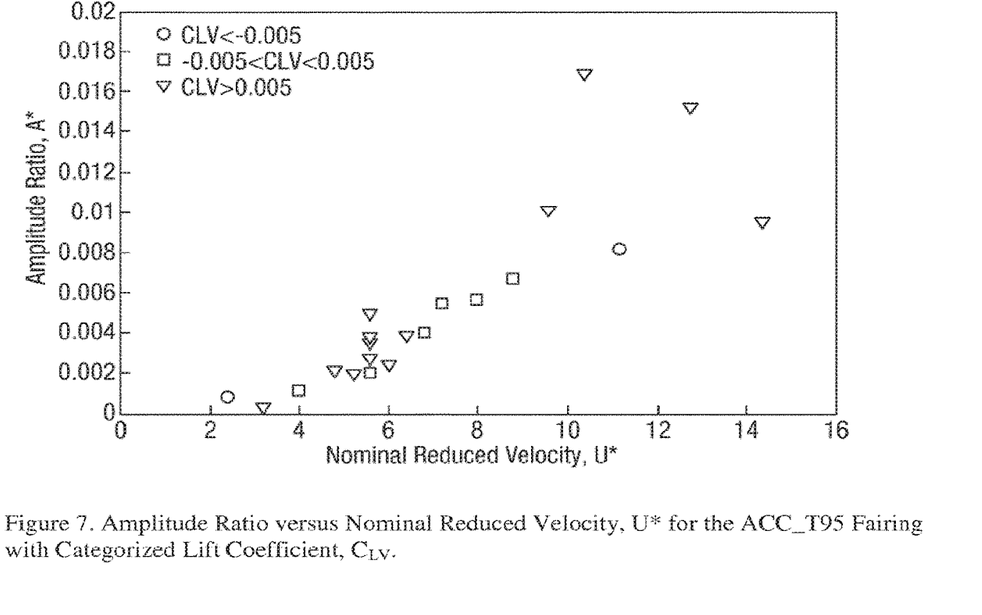
FIG. 7. Amplitude Ratio versus Nominal Reduced Velocity, U* for the ACC_T95 Fairing with Categorized Lift Coefficient, $C_{LV}$.

In FIG. 7 the amplitude, A*, has been plotted against the nominal reduced velocity, U* for the for the ACC_T95 fairing. The data was screened so only those points where the lift coefficient was almost zero (−0.005<$C_{LV}$<0.005) has been plotted as well data with lift coefficients greater than 0.005. No VIV was evident. The dimensions of this this particular fairing embodiment are given in Table 2.

Figure 8:
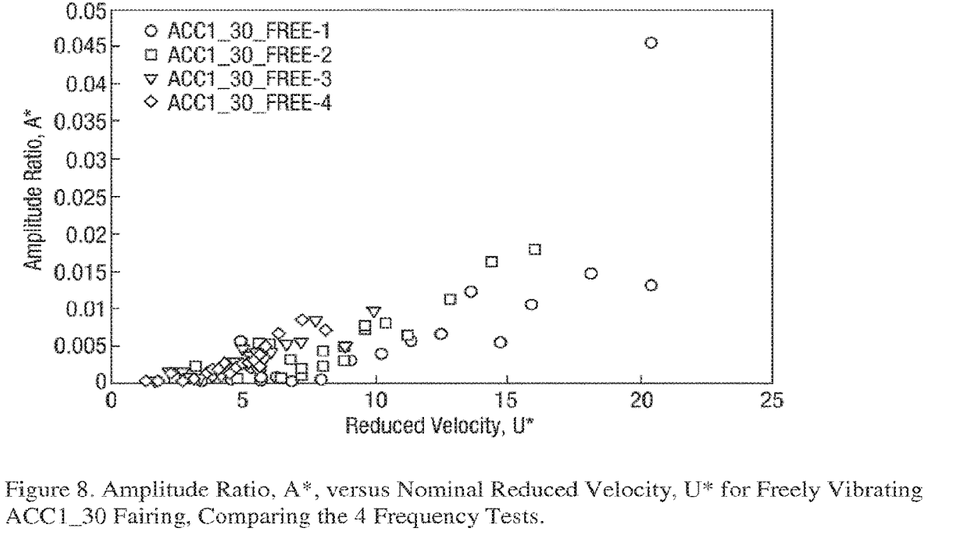
FIG. 8. Amplitude Ratio, A*, versus Nominal Reduced Velocity, U* for Freely Vibrating ACC1_30 Fairing, Comparing the 4 Frequency Tests.

Under certain circumstances during deployment in the ocean, a fairing may become "stuck" in position. This may due to excessive marine growth or other mechanical reasons. For experimental purposes, an ACC1 fairing was fixed with a pitch of 30 degrees was also tested. The dimensions of this this particular fairing embodiment are given in Table 1, with the exception that, for this experiment, the center ACC1 fairing was fixed at an angle of 30 degrees, in relation to the two neighboring fairings. In FIG. 8, the amplitude, A*, has been plotted versus the nominal reduced velocity, U* for each of the frequencies tested. The data shows that the different spring stiffness, hence frequencies, had a significant effect on the A* of the fairing for the entire range of U* tested. It may be observed that, the A*-U* curve shifts toward left as the spring stiffness increases.

Conclusions from the Fixed Drag Tests:

The geometric variations of the fairings had noticeable effect on their drag values in the fixed tests. The drag on the basic ACC1 fairings are approximately half of that of the bare pipe, thus the fairings reduces 50% of drag in the system.

Conclusions from the Free VIV Tests:

Bare pipe tests were conducted to validate the apparatus setup, and the results matched well with historical data. The peak amplitude of the VIV response was A*=0.89 at a reduced velocity U* of 8.2. The drag coefficient varied from about 1.0 when there was little VIV to about 3.0 when there was significant VIV lock-in.

The asymmetric crab claw (ACC1) fairing reduced the amplitude of VIV over the entire reduced velocity range tested (0<U*<22).

In general, the difference between the ACC fairings in terms of A* was very small which essentially means that in terms of VIV suppression all four fairings are satisfactorily efficient. More specifically, fairings with shorter chord length provides higher VIV suppression efficiency than the fairings with longer chord lengths.

Data Processing

The basic data analysis consisted of determining the amplitude of vibration (VIV) A* and the nominal reduced velocity U* are defined as follows:

$$A^* = \frac{\sqrt{2}\,\sigma_Z}{D_R} \qquad 1$$

$$V_{RN} = U^* = \frac{V}{f_{N(V=0)}D_R}.$$

Where $\sigma_z$ is the standard deviation of the cross-flow (z) amplitude of motion and $D_R$ is the reference diameter taken as the outside diameter (maximum thickness) of the fairing. V is the carriage speed or flow velocity. The natural frequency, $f_{N(V=0)}$, is typically taken from still water experiments however for these experiments a low flow speed was required to align the units.

$C_D$, CD=Drag coefficient $C_{LV}$, $C_L$=Lift coefficient (lift force in phase with cylinder cross flow velocity)

$C_M$=Added mass coefficient (lift force in phase with cylinder cross flow acceleration)

Theoretical Studies of Stability

Figure 9A:
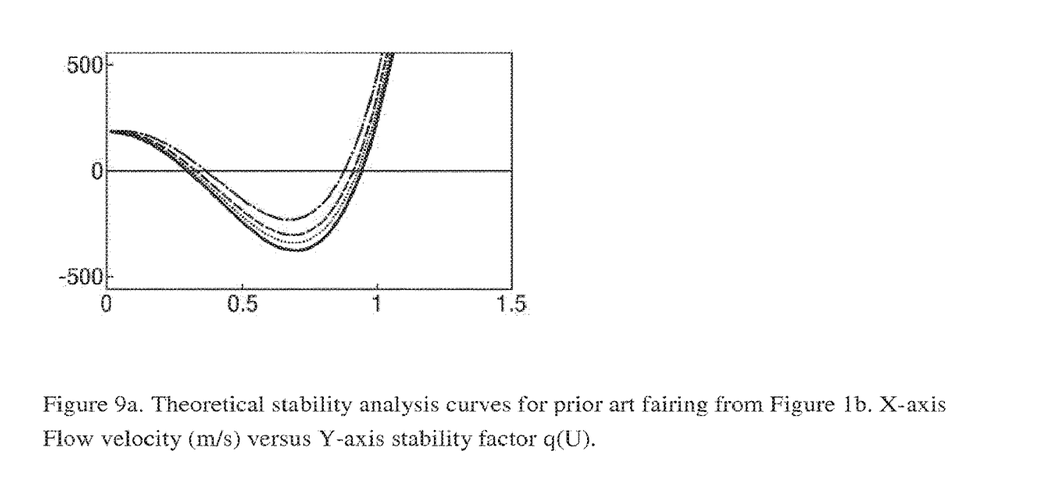
FIG. 9a. Theoretical stability analysis curves for prior art fairing from FIG. 1b.
Figure 9B:
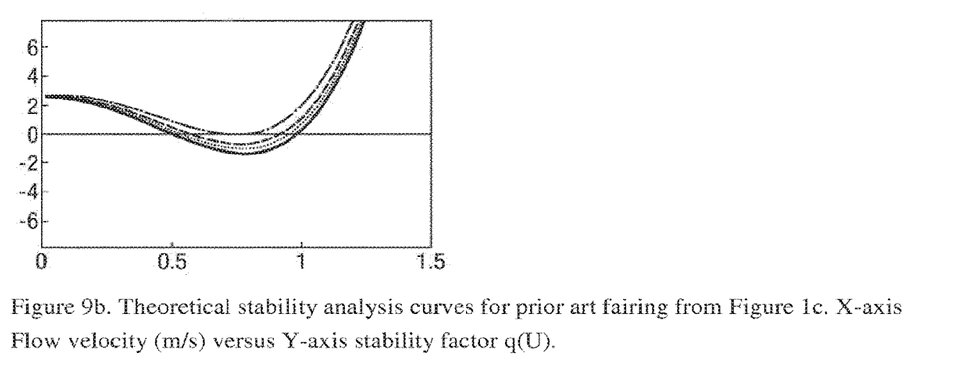
FIG. 9b. Theoretical stability analysis curves for prior art fairing from FIG. 1c.
Figure 9C:
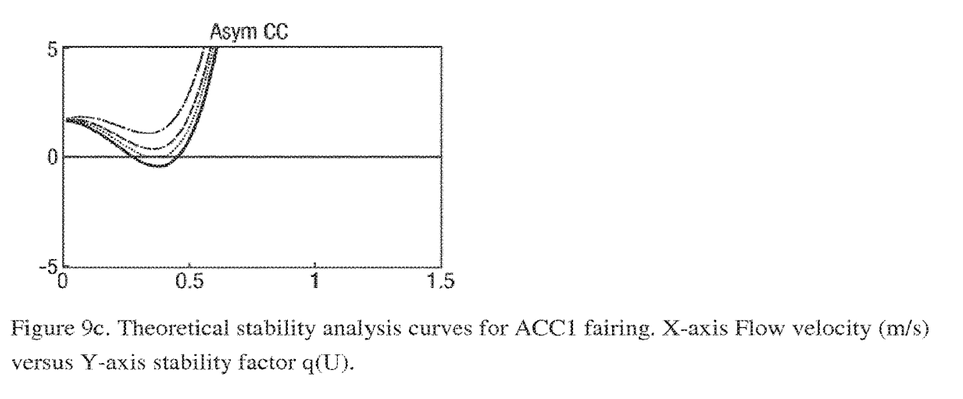
FIG. 9c. Theoretical stability analysis curves for the ACC1 fairing.

FIGS. 9a-c show modeling results of the stability analysis for 3 fairing types, as based on the criteria in Blevins (1990) and Newman (1977) and iteration using Routh's method with further derivations and parameterizations as given in Kristiansen (2009) and Faltinsen (2005).

The form of the polynomial in the case of an undamped fairing is given on the y-axis (q(u) [(kg m/s)$^4$]) as:

$$q(U) = q_4 U^4 + q_2 U^2 + q_0 = 0,$$

and is represented by the bottom curve for each of the given fairing types. The x-axis represents the flow velocity (U) in meter/s. For the simulation cases where an empirical Rayleigh damping term ($q_1 U$) is added, the polynomial for the y-axis takes the following form:

$$q(U) = q_4 U^4 + q_2 U^2 + q_1 U + q_0 = 0,$$

where $$q_1 = 2\xi\sqrt{q_4 q_0},$$

and $\xi$ is a nondimensional number. Higher values for $\xi$ result in higher damping.

The bottom curve for each fairing type represents a simulation without the damping term ($q_1 U$). Instability and flutter can appear when the value for q(U) on the curve is negative. The next curve adjacent to the bottom undamped curve includes the damping term $q_1 U$ with $\xi$=0.04. The next adjacent curve includes the damping term $q_1 U$ with $\xi$=0.08. The next adjacent, top, curve includes the damping term $q_1 U$ with $\xi$=0.16.

The terms $q_4$, $q_2$ and $q_0$ are further expressed by the following:

$$q_4 = (M\kappa - \tau m_f)^2,$$

$$q_2 = 2k\{2\kappa(m_f)^2 - I(M\kappa + \tau m_f)\},$$

$$q_0 = k^2 I^2$$

I represents the moment of inertia, $m_f$ represents the mass of the fairing and r represents the distance between the elastic center (EC) and the center of gravity (CG). k, M, κ, and τ are parameterization terms as given or derived from the publications cited above.

For systems that have continuous non-negative q(U) values, they are also unconditionally stable. With an emphasis on the results for the ACC1, it can be seen that under real-world conditions with some degree of normal damping, the ACC1 fairing can be seen to be exhibit significant stability, whereas the EM and Tail-fin fairings exhibit a need for more damping than the ACC1 fairing.

As seen from numerous laboratory experiments as well as theoretical studies, fairing devices with parallel fins, such as shown in FIG. 1a, and/or long fins, with higher chord length ratios, are generally less efficient with higher drag and less hydrodynamically stable. The combined features of the present invention have shown that smaller, lighter fairings are more hydrodynamically efficient, less bulky, easier to store and easier to install without the need for an ROV. In addition, the present invention is seen to be deployable in a wide range of flow-regimes, corresponding to varying ocean current conditions experienced in various geographic locations worldwide.

Another advantage according to the present invention, as compared to the prior art, is that the separate ACC fairings operate independently all along the vertical length of the riser. Consider that when operating a fairing in a column of water, the conditions at the top of the riser can be completely different than on the lower section. As such, it is important to have a fairing which is stable in many operating conditions. According to the fairing type of the present invention, it is possible to advantageously deploy many such fairings installed in proximity to each other. This may be a normal configuration when many fairings are needed such as there may be many production risers on a vessel. Given that the fairing as described is globally stable, it can handle the unstable conditions which can occur in some settings. This is a major advantage. The prior art fairings the might work well at one section of the riser, but they may not work well on other sections. The instability generated at one level can cause instability in other sections.

Method for Preinstallment of Fairings

Figure 10:
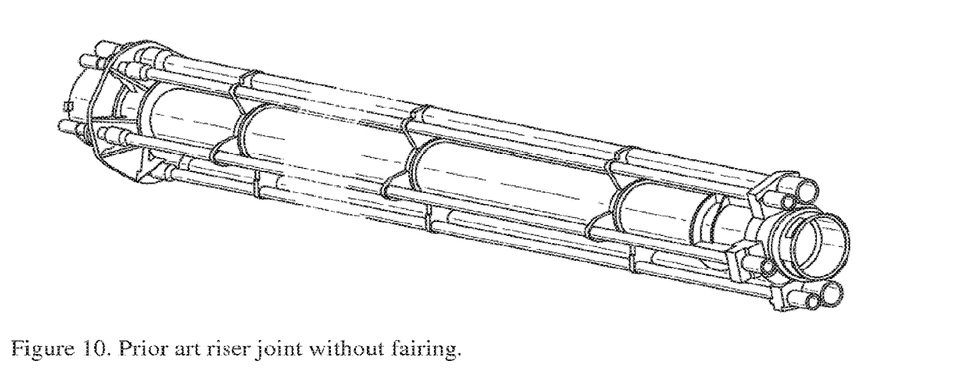
FIG. 10. Prior art riser joint.
Figure 11:
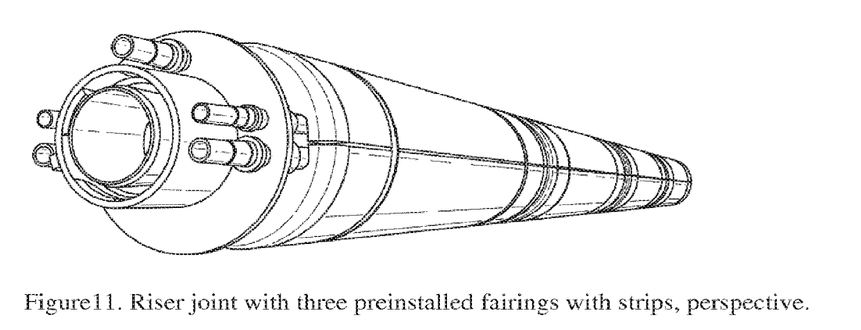
FIG. 11. Riser joint with three preinstalled fairings with removable restraining devices, perspective.

Another main aspect of the fairings according to the present invention is that they are constructed in such a way that they can be preinstalled onto joint sections, for example drilling risers, prior to deployment. The key point here is that the fairings may be attached to drilling risers with the aim of saving storage space on platforms, prior to deployment. The fairings must therefore be small enough and made in such a way that it can envelop and seal the drilling riser when not in use. FIG. 10 shows a standard prior art riser joint prior to the mounting of a fairing. FIG. 11 shows a standard prior art riser joint with preinstalled fairings, according to the present invention. Here it is shown with a set of three fairings that are held in place around the circumference of the riser joint by means of removable restraining devices. The removable restraining devices may comprise a stiff material such as strips made of plastic or thin metal or similar. Thus a riser joint can be stored with fitted fairings. The preferred embodiment is with asymmetric crab claw fairings (ACC), and with fins that can be folded around the back of the riser, without overlap. Thus, the fins are brought into close proximity to the riser during storage in order to save storage space. The present novel method of preinstalling fairings can apply to any of the asymmetric type of fairing in the embodiments previously disclosed above, or in any type of asymmetric or symmetric fairings that comprise flexible, foldable fins.

Preinstallment of fairings is a novel concept and represents a further novel aspect of the present invention. All existing fairings today are installed after the riser joint is connected in the riser string. The design of the fairings according to the present invention enables the fairing to be folded and can easily be preinstalled.

This method and related embodiments are directly applicable to the previously mentioned fairings that can be preinstallable on a cylindrical element. For a marine drilling riser, this means that a drilling riser joint can be fitted with a marine fairing before being mounted on the riser string. Storage capacity on a normal marine faring rack can be limited, and the present invention assists in alleviating space requirement issues. The tolerance for clearance between marine risers may vary during storage, and hence the requirements may vary for this reason. For newbuilds, this can be adjusted.

The invention comprises a fairings design that is foldable and thereby reduces the dimension during storage. When made ready for deployment, the opening mechanism is activated to lock the fairings in a intended position and stiffening the structure to stay in place during operation.

When the riser is to be immersed in the ocean, the farings can be activated. The fairings can be activated in the following manner:

The fairings comprise hinged shape-fixation devices on the inside of the fairings that fold out when the fairings are opened, or the fairings comprise grooves on the inside of the fairings, whereby the fins can be folded back and shape-fixation devices can by inserted and clicked into place to ensure the shape of fairings.

Figure 12:
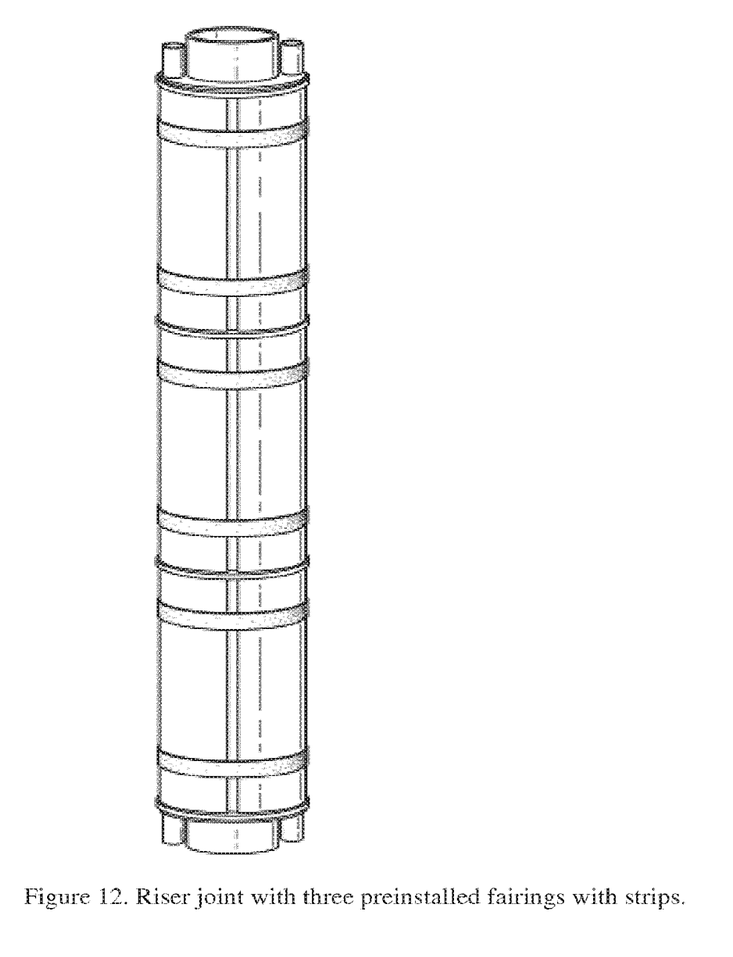
FIG. 12. Riser joint with three preinstalled fairings with removable restraining devices.
Figure 13:
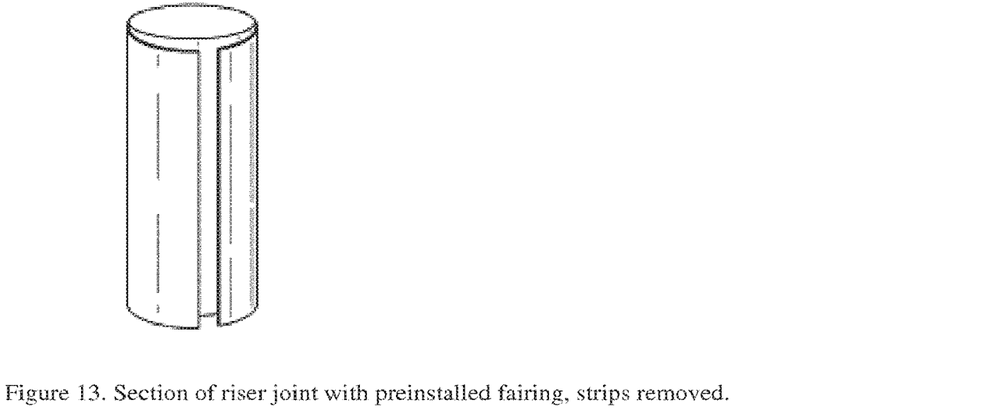
FIG. 13. Section of riser joint with one preinstalled fairing, removable restraining devices removed.
Figure 14:
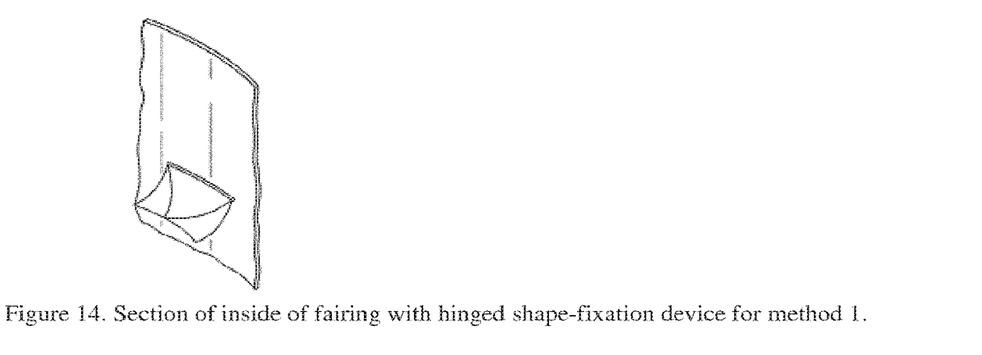
FIG. 14. Section of inside of fairing with hinged shape-fixation device for method 1.
Figure 15:
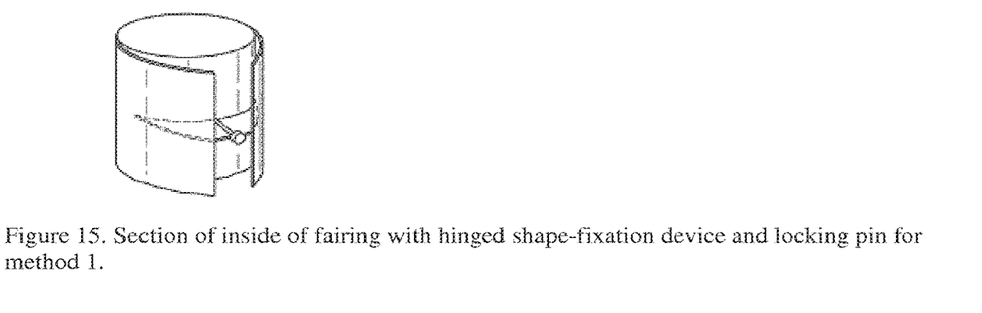
FIG. 15. Section of inside of fairing with hinged shape-fixation device and locking pin for method 1.
Figure 16:
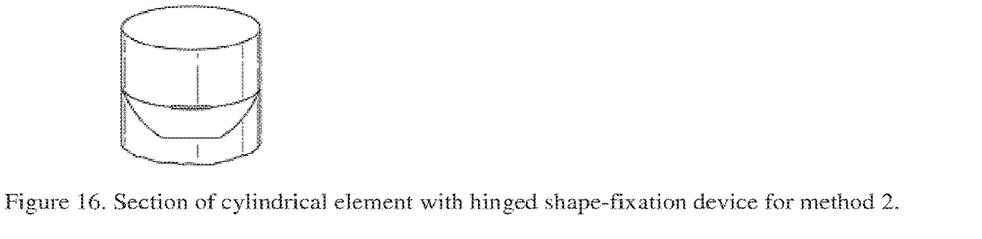
FIG. 16. Section of cylindrical element with hinged shape-fixation device for method 2.
Figure 17:
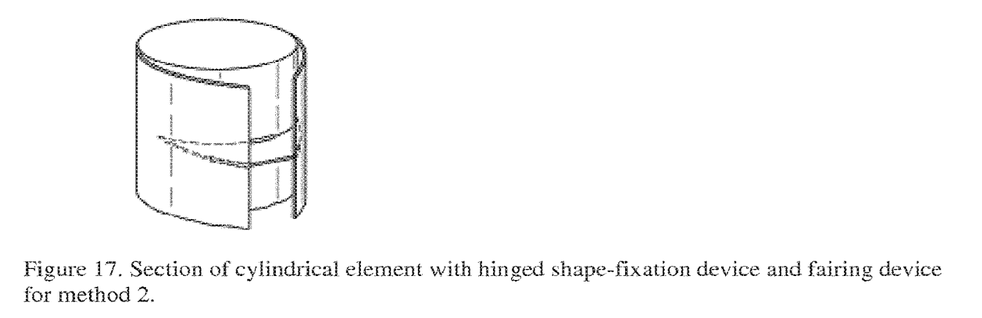
FIG. 17. Section of cylindrical element with hinged shape-fixation device and fairing device for method 2.
Figure 18:
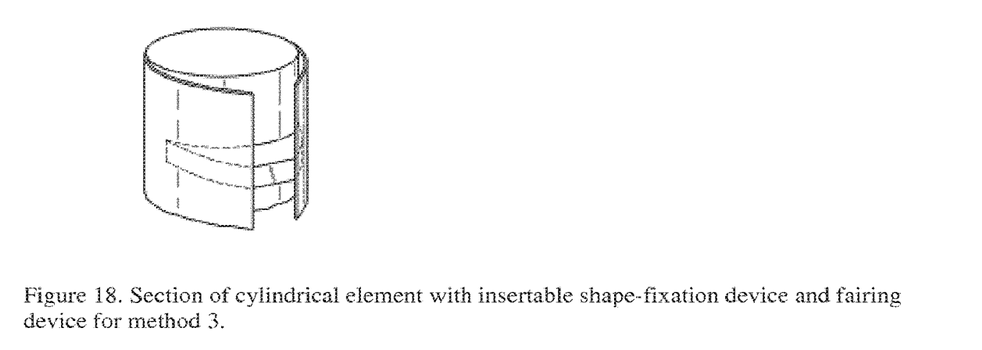
FIG. 18. Section of cylindrical element with insertable shape-fixation device and fairing device for method 3.

By way of example, FIG. 10 shows a riser joint prior to the mounting of a fairing. FIG. 11 shows a riser joint with preinstalled fairings in perspective with removable restraining devices according to the present invention. FIG. 12 is another view of the riser joint with preinstalled fairings with removable restraining devices from FIG. 11, in vertical. In both FIGS. 11 and 12, the fairing devices are of the symmetric type, whereby three fairing devices are mounted on the cylindrical riser joint. FIG. 13 shows one partially opened preinstalled fairing device, from either FIG. 11 or 12, whereby the removable restraining devices have been removed and the fairing device is partially opened prior to deployment. FIG. 14 shows a section inside of a fairing fin with a hinged shape-fixation device according to one method and embodiment of the present invention. The hinged shape-fixation device is shown to comprise two foldable flaps whereby one or both flaps can be folded inwards in order to conform to the shape of the cylindrical element. FIG. 15 shows a further stage, according to FIG. 14, whereby a hinged shape-fixation device from each fairing fin conforms to the shape of the cylindrical element and held in place with a locking pin. The riser joint is then ready for deployment. FIG. 16 shows a section of a cylindrical element with hinged shape-fixation device according to another method and embodiment of the present invention. In this embodiment, the hinged shape-fixation device may be fixed to the cylindrical element prior to the mounting of the fairing device. Optionally, the hinged shape-fixation device may be fixed to the cylindrical after the fairing has been preinstalled. FIG. 17 shows a further stage, according to FIG. 16, whereby the hinged shape-fixation device is folded outward, conforms to the shape of the fairing device and held in place by grooves located on the inside of the fin-like portions of the fairing device. The riser joint is then ready for deployment. FIG. 18 shows a section of a cylindrical element with a section of a preinstalled fairing according to yet another method and embodiment of the present invention. A shape-fixation device is shown to be inserted between the cylindrical element and the fairing fins, and held in place by grooves located on the inside of the fin-like portions of the fairing device. The riser joint is then ready for deployment.

A further embodiment of the present method can comprise removal of the restraining devices and the fairing would spring into place due to the stiffness of the fairing material. This could be done in the water or on deck, after or before deployment of the string.

In yet another embodiment of the present invention, a lever could be attached between the fins, whereby the lever could be activated by an ROV, if in the water, which could force the fins into the correct VIV-reducing position.

The main advantages and improvements achieved with all of the embodiments according to the present invention in comparison with the prior art include the following:

No operational limits for offshore drilling operations due to drilling riser fatigue from vortex induced vibrations (VIV). This saves time and cost for offshore operators.

Size/weight: Reduced time spent to fit/mobilize VIV suppression device on an offshore drilling rig. This also saves time and cost for offshore operators.

Low drag forces on drilling riser: Reduce stress on riser and attached elements.

Performance: Increased ability to suppress vortex induced vibrations (VIV).

Drag forces: Reduced as compared to known technology.

Global stability: Performs stabile for all conditions.

Robustness: Increased robustness of a suppression device

Preinstallment of fairings is effective in terms of time, cost and storage space.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the scope of the appended claims.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously.

What is claimed is:

1. A method for the mounting, storage and deployment of a plurality of fairing devices for the reduction of vortex-induced vibrations or motions and minimization of drag about a plurality of substantially cylindrical elements capable of being immersed in a fluid medium,
comprising the following steps:
a) creating a plurality of joint sections prepared for storage by mounting said fairing devices around respective cylindrical elements of the plurality of cylindrical elements, wherein said fairing devices each include fin-like portions which are held in close proximity around the respective cylindrical element;
b) connecting said plurality of joint sections together in a string for deployment into said fluid medium;
c) actuating said fairing devices, by bringing said fin-like portions out from said close proximity around the respective cylindrical element; and
d) immersing said string comprising said plurality of connected joint sections into said fluid medium.

2. The method of claim 1, further comprising:
applying at least one shape-fixation device inside at least one of the fairing devices along an axial direction by unfolding said at least one shape-fixation device from between the respective cylindrical element and the at least one of the fairing devices; and
securing and locking the at least one shape fixation device to the at least one of the fairing devices and to the respective cylindrical element by means of a locking pin.

3. The method of claim 2 wherein each of said fairing devices is an asymmetric fairing device.

4. The method of claim 2 wherein each of said fairing devices is a symmetric fairing device.

5. The method of claim 2 wherein said string is a marine riser.

6. The method of claim 1, further comprising:
applying at least one shape-fixation device inside at least one of the fairing devices along an axial direction by unfolding said at least one shape-fixation device from between the respective cylindrical element and the at least one of the fairing devices; and
securing and locking the at least one shape-fixation device to the at least one of the fairing devices and to the respective cylindrical element by means of grooves within the inside of the at least one of the fairing devices.

7. The method of claim 6 wherein each of said fairing devices is an asymmetric fairing device.

8. The method of claim 6 wherein each of said fairing devices is a symmetric fairing device.

9. The method of claim 6 wherein said string is a marine riser.

10. The method of claim 1, further comprising:
applying at least one shape-fixation device inside at least one of the fairing devices along an axial direction by inserting said at least one shape-fixation device into the inside of the at least one of the fairing devices along the axial direction; and
securing and locking the at least one shape-fixation device to the at least one of the fairing devices and to the respective cylindrical element by means of grooves within the inside of the at least one of the fairing devices or with locking pins.

11. The method of claim 10 wherein each of said fairing devices is an asymmetric fairing device.

12. The method of claim 10 wherein each of said fairing devices is a symmetric fairing device.

13. The method of claim 10 wherein said string is a marine riser.

14. The method of claim 1, wherein the step of immersing is performed prior to the step of actuating.

15. The method of claim 14, wherein said step of actuating is performed by means of an ROV.

16. The method of claim 15 wherein said string is a marine riser.

17. The method of claim 14 wherein each of said fairing devices is an asymmetric fairing device.

18. The method of claim 14 wherein each of said fairing devices is a symmetric fairing device.

19. The method of claim 14 wherein said string is a marine riser.

20. The method of claim 1, wherein each of said fairing devices is an asymmetric fairing device.

21. The method of claim 20 wherein said string is a marine riser.

22. The method of claim 1, wherein each of said fairing devices is a symmetric fairing device.

23. The method of claim 1 wherein said string is a marine riser.

* * * * *